(12) United States Patent
Kato (10) Patent No.: US 11,343,747 B2
(45) Date of Patent: May 24, 2022

(54) CONTROL DEVICE, COMMUNICATION DEVICE, CONTROL METHOD, AND NON-TRANSITORY COMPUTER READABLE MEDIUM

(71) Applicant: NEC Corporation, Tokyo (JP)

(72) Inventor: Rintaro Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 16/707,023

(22) Filed: Dec. 9, 2019

(65) Prior Publication Data

US 2020/0196218 A1  Jun. 18, 2020

(30) Foreign Application Priority Data

Dec. 12, 2018  (JP) .............................. JP2018-232541

(51) Int. Cl.
*H04W 40/12* (2009.01)
*G08C 17/02* (2006.01)
*H04B 17/309* (2015.01)

(52) U.S. Cl.
CPC ............ *H04W 40/12* (2013.01); *G08C 17/02* (2013.01); *H04B 17/309* (2015.01)

(58) Field of Classification Search
CPC .. H04W 40/12; H04W 28/0967; G08C 17/02; H04B 17/309; H04L 47/125

USPC ........................................................ 370/252
See application file for complete search history.

(56) References Cited

U.S. PATENT DOCUMENTS

| 10,250,478 | B2 * | 4/2019 | Suto ........................ H04L 43/10 |
| 2017/0257302 | A1 | 9/2017 | Suto |
| 2018/0317204 | A1 * | 11/2018 | Koue .................... H04W 48/18 |

FOREIGN PATENT DOCUMENTS

JP  2017-163196 A  9/2017

* cited by examiner

*Primary Examiner* — Kwang B Yao
*Assistant Examiner* — Syed M Bokhari
(74) *Attorney, Agent, or Firm* — Sughrue Mion, PLLC (57) ABSTRACT

A distributing control unit performs provisional switching control processing to a distributing unit when a link in use for first data units is a first link and a candidate link to be used is a second link. For example, the distributing control unit distributes at least one of the data units of the first data units of the data stream to the second link and distributes other data units to the first link. A determining unit determines whether or not a link in use for second data units subsequent to the first data units is to be switched from the first link to the second link based on first and second communication qualities, the first and second communication qualities being based on feedback information. The first and second communication qualities are communication qualities of the other data units and the at least one of the data units, respectively.

7 Claims, 10 Drawing Sheets

| CANDIDATE LINK TO BE USED / LINK IN USE | COMMUNICATION QUALITY STATE (SATISFACTORY) | COMMUNICATION QUALITY STATE (UNSATISFACTORY) | NO SCORE |
|---|---|---|---|
| COMMUNICATION QUALITY STATE (SATISFACTORY) | MAINTAIN LINK IN USE | MAINTAIN LINK IN USE | MAINTAIN LINK IN USE |
| COMMUNICATION QUALITY STATE (UNSATISFACTORY) | SWITCH LINK IN USE | SELECT LINK HAVING HIGHER SCORE | SWITCH LINK IN USE |
| NO SCORE | SWITCH LINK IN USE | MAINTAIN LINK IN USE | MAINTAIN LINK IN USE |

CONTROL DEVICE, COMMUNICATION DEVICE, CONTROL METHOD, AND NON-TRANSITORY COMPUTER READABLE MEDIUM

INCORPORATION BY REFERENCE

This application is based upon and claims the benefit of priority from Japanese patent application No. 2018-232541, filed on Dec. 12, 2018, the disclosure of which is incorporated herein in its entirety by reference.

TECHNICAL FIELD

The present disclosure relates to a control device, a communication device, a control method, and a control program.

BACKGROUND ART

A technique of switching communication channels among a plurality of communication channels based on a communication delay time has been proposed (see, Japanese Unexamined Patent Application Publication No. 2017-163196).

However, in the technique disclosed in Japanese Unexamined Patent Application Publication No. 2017-163196, in order to confirm the communication delay time (i.e., the communication quality), a PING command is transmitted and the communication delay time is confirmed by using the PING command. The PING command is a signal for merely measuring the communication delay time and is not data that is desirable for actual transmission and thus the PING command itself becomes an overhead. Therefore, there is a possibility that the resource usage efficiency could be lowered.

SUMMARY

An object of the present disclosure is to provide a control device, a communication device, a control method, and a control program by which links can be switched while preventing the resource usage efficiency from being lowered.

A control device according to a first example aspect includes:

a distributing unit configured to distribute data units included in a series of data units to a first link and a second link;

an acquisition unit configured to acquire information related to communication quality of the series of data units as feedback information from a reception-side device configured to receive the series of data units;

a distributing control unit configured to perform provisional switching control processing for instructing the distributing unit to distribute at least one data unit of first data units among the series of data units to the second link and distribute the other data units of the first data units to the first link when a link in use for the first data units is the first link and a candidate link to be used is the second link; and a determining unit configured to determine whether or not a link in use for second data units subsequent to the first data units is to be switched from the first link to the second link based on first communication quality of the other data units and second communication quality of the at least one data unit, the first communication quality and the second communication quality being determined according to the feedback information.

A control method according to a second example aspect includes:

distributing data units included in a series of data units to a first link and a second link;

acquiring information related to communication quality of the series of data units as feedback information from a reception-side device configured to receive the series of data units;

instructing, in the distributing of the data units, to distribute at least one data unit of first data units among the series of data units to the second link and distribute the other data units of the first data units to the first link when a link in use for the first data units is the first link and a candidate link to be used is the second link; and determining whether or not a link in use for second data units subsequent to the first data units is to be switched from the first link to the second link based on first communication quality of the other data units and second communication quality of the at least one data unit, the first communication quality and the second communication quality being determined according to the feedback information.

A control program according to a third example aspect causes a computer to execute processes of:

distributing data units included in a series of data units to a first link and a second link;

acquiring information related to communication quality of the series of data units as feedback information from a reception-side device configured to receive the series of data units;

instructing, in the distributing of the data units, to distribute at least one data unit of first data units among the series of data units to the second link and distribute the other data units of the first data units to the first link when a link in use for the first data units is the first link and a candidate link to be used is the second link; and determining whether or not a link in use for second data units subsequent to the first data units is to be switched from the first link to the second link based on first communication quality of the other data units and second communication quality of the at least one data unit, the first communication quality and the second communication quality being determined according to the feedback information.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Hereinbelow, example embodiments are described with reference to the figures. Note that the same reference symbol is allocated to the same or equivalent elements and duplicated explanation is omitted.

First Example Embodiment

<Outline of a Communication System>

Figure 1:
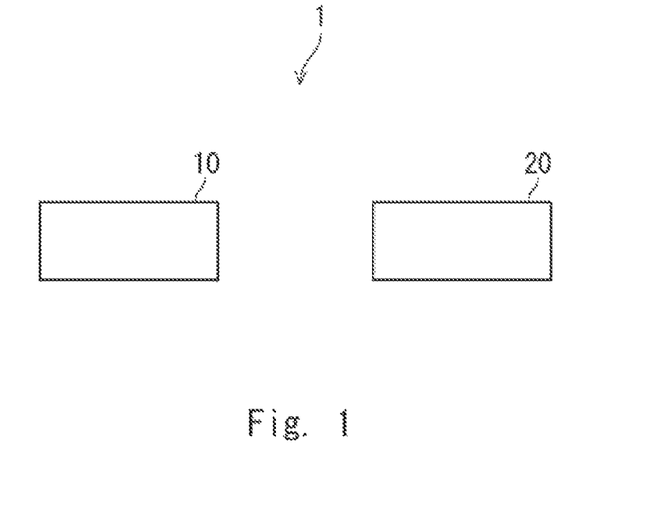
FIG. 1 is a diagram showing an example of a communication system according to a first example embodiment.

FIG. 1 is a diagram showing an example of a communication system according to a first example embodiment. In FIG. 1, a communication system 1 includes a communication device 10 on the transmission side and a communication device 20 on the reception side. A "first link" and a "second link" are established between the communication devices 10 and 20. The "first link" and the "second link" may be of communication systems that are different from each other. For example, the "first link" may be any one of Wi-Fi (registered trademark), BLE (Bluetooth Low Energy (registered trademark)), ZigBee (registered trademark), or LTE and, the "second link" may be a communication system other than the one selected above. Alternatively, the "first link" and the "second link" may be of the same communication system but have communication resources different from each other. Here, the communication resource is a resource defined by, for example, at least one of time, frequency, and code. Further, a radio communication or a wire communication may be performed between the communication devices 10 and 20. That is, the "first link" and the "second link" may be radio links or wired links. Note that here, two links are being focused on, however links other than the "first communication link" and the "second communication link" may be established between the communication devices 10 and 20. Hereinbelow, as an example, an explanation is given on an assumption that the "first link" and the "second link" are of different communication systems from each other and are wireless links.

The communication device 10 transmits a data stream (i.e., a series of data units) to the communication device 20 using the first and second links. Here, one of the first and second links is used at an arbitrary timing. Further, the data unit is, for example, a data packet.

<Example of a Configuration of a Communication Device on the Transmission Side>

Figure 2:
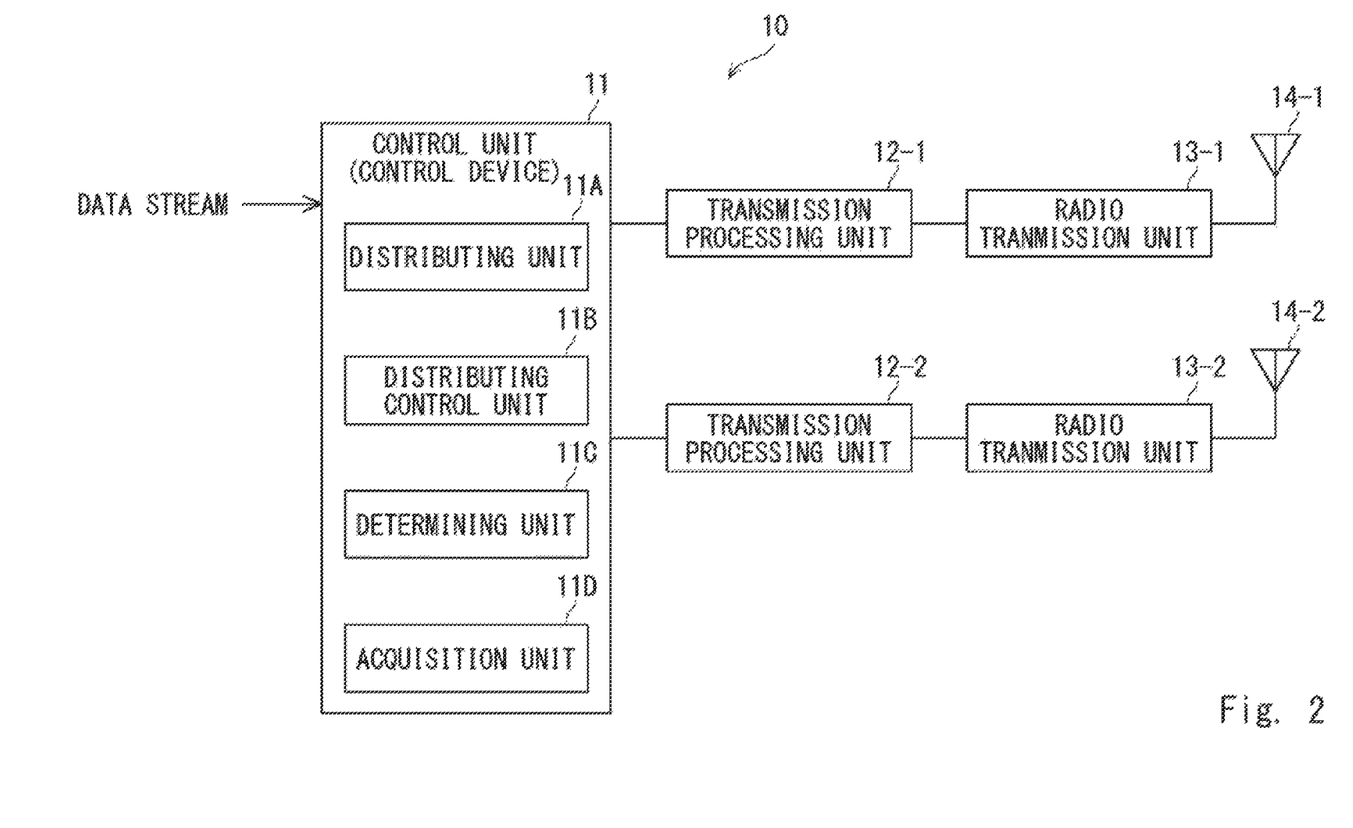
FIG. 2 is a block diagram showing an example of a communication device on a transmission side including a control device according to the first example embodiment.

FIG. 2 is a block diagram showing an example of a communication device on the transmission side including a control device according to the first example embodiment. In FIG. 2, the communication device 10 includes a control unit (a control device) 11, transmission processing units 12-1 and 12-2, radio transmission units 13-1 and 13-2, and antennas 14-1 and 14-2. The transmission processing unit 12-1, the radio transmission unit 13-1, and the antenna 14-1 correspond to the "first link", and the transmission processing unit 12-2, the radio transmission unit 13-2, and the antenna 14-2 correspond to the "second link". The transmission processing units 12-1 and 12-2 can be collectively referred to as "transmission processing units 12". Further, the radio transmission units 13-1 and 13-2 can be collectively referred to as "radio transmission units 13". Further, the antennas 14-1 and 14-2 can be collectively referred to as "antennas 14". Note that the communication device 10 may also include the transmission processing unit 12, the radio transmission unit 13, and the antenna 14 applicable to links of communication systems different from the "first link" and the "second link". Further, when the "first link" and the "second link" are of the same communication system having different communication resources, the communication device 10 may include the transmission processing unit 12-1, the radio transmission unit 13-1, and the antenna 14-1 but may not include the transmission processing unit 12-2, the radio transmission unit 13-2, and the antenna 14-2.

The data stream (i.e., the series of data units) is input to the control unit (the control device) 11. The data stream input to the control unit (the control device) 11 may be a data stream from applications of the communication device 10 or may be a data stream from applications of another communication device (not shown) that is connected to the communication device 10.

The control unit 11 includes a distributing unit 11A, a distributing control unit 11B, a determining unit 11C, and an acquisition unit 11D.

The distributing unit 11A distributes the series of data units input to the control unit 11 to the first and second links according to the control performed by the distributing control unit 11B. Here, the distributing unit 11A may include a retransmission buffer for holding data units transmitted during a predetermined period including a timing at which provisional (temporary) switching control processing to be described later is performed. By this structure, it is possible to retransmit the data units held in the retransmission buffer whenever necessary.

The distributing control unit 11B performs the "provisional switching control processing" to the distributing unit 11A. Here, it is assumed that the current "link in use" is the first link and "a candidate link which the link is to be switched to" (hereinafter referred to as "a candidate link to be used) is the second link. Further, it is assumed that the data stream includes "first data units" and "second data units" subsequent to the first data units. In this case, the distributing control unit 11B firstly instructs the distributing unit 11A to transmit the "first data units" to the first link by distributing the data units of the "first data units" to the first link. Then, the distributing control unit 11B instructs the distributing unit 11A to tentatively distribute the data units of the "first data units" to the second link at a predetermined timing (i.e., at a timing at which the provisional switching control processing is performed) and to transmit a data stream using the second link. That is, the distributing control unit 11B instructs the distributing unit 11A to perform the "provisional switching control processing", by which the data units (hereinafter also referred to as other data units) among the first data units excluding some of the data units are distributed to the first link and the some of the data units are distributed to the second link by the distributing unit 11A. Then, the distributing control unit 11B instructs the distributing unit 11A to distribute the "second data units" to the second link when the determining unit 11C determines to switch the link in use from the first link to the second link. Accordingly, real switching is performed and transmission of the "second data units" using the second link starts. Alternatively, the distributing control unit 11B instructs the distributing unit 11A to distribute the "second data units" to the first link when the determining unit 11C determines that the link in use is not to be switched from the first link to the second link. Thus, transmission of the "second data units" using the first link starts. That is, a test transmission using the second link ends and the processing returns to transmission using the first link which is the link in use.

The acquisition unit 11D acquires information related to communication quality of the data stream as "feedback information" from the communication device 20 serving as a reception-side device. Here, a feedback exclusive link (not shown) may be used for transmission of the "feedback information". Alternatively, a link (not shown) corresponding to the first link may be used for transmission of the communication quality of the data units transmitted using the first link, and a link (not shown) corresponding to the second link may be used for transmission of the communication quality of the data units transmitted using the second link. Further, a link (not shown) corresponding to the second link may be used for transmission of the "feedback information".

The determining unit 11C determines whether or not to switch the link in use for the "second data units" from the first link to the second link based on "first communication quality" and "second communication quality" according to the "feedback information". The "first communication quality" is the communication quality of the "other data units" transmitted using the first link. The "second communication quality" is the communication quality of the "some of the data units" transmitted using the second link. For example, the determining unit 11C determines that the link in use is to be switched from the first link to the second link when the second communication quality is higher than the first communication quality. When the determining unit 11C determines that the link in use is to be switched from the first link to the second link, it outputs a switching instruction signal to the distributing control unit 11B whereas it may output an upholding instruction signal to the distributing control unit 11B when it determines that the link in use is not to be switched. Alternatively, the determining unit 11C may, for example, determine that the link in use is to be switched from the first link to the second link when the second communication quality is higher than a predetermined level as well as higher than the first communication quality.

The transmission processing unit 12-1 performs transmission processing (modulation etc.) to the data units that have been distributed to the first link by the distributing unit 11A and outputs the obtained data units that have been transmission-processed to the radio transmission unit 13-1. The transmission processing unit 12-2 performs transmission processing (modulation etc.) to the data unit that has been distributed to the second link by the distributing unit 11A and outputs the obtained data unit signal of the transmitted data unit that has been transmission-processed to the radio transmission unit 13-2.

The radio transmission unit 13-1 performs radio transmission processing (digital-to-analogue conversion, up-conversion etc.) to a data unit signal received from the transmission processing unit 12-1 and transmits the obtained transmission radio signal through the antenna 14-1. The radio transmission unit 13-2 performs radio transmission processing (digital-to-analogue conversion, up-conversion etc.) to the data unit signal received from the transmission processing unit 12-2 and transmits the obtained transmission radio signal through the antenna 14-2.

<Example of a Configuration of a Communication Device on the Reception Side>

Figure 3:
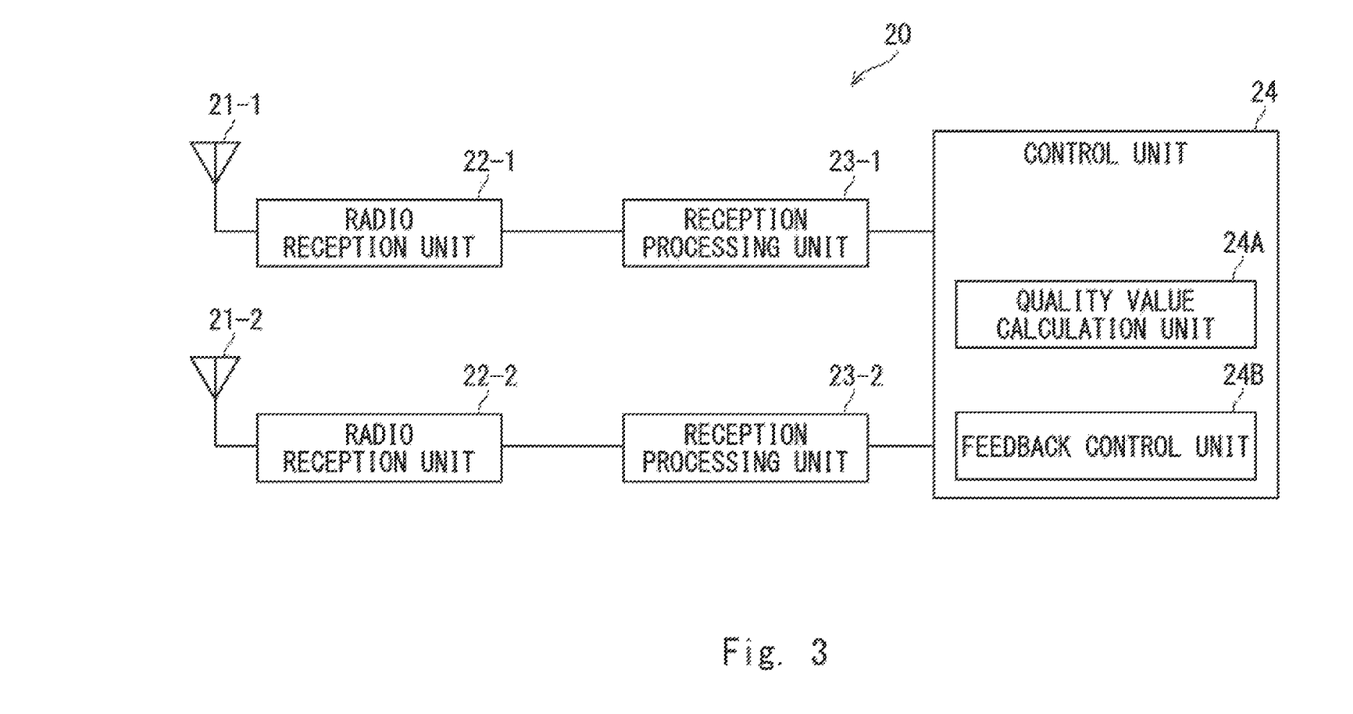
FIG. 3 is a block diagram showing an example of a communication device on a reception side according to the first example embodiment.

FIG. 3 is a block diagram showing an example of a communication device on the reception side according to the first example embodiment. In FIG. 3, the communication device 20 includes antennas 21-1 and 21-2, radio reception units 22-1 and 22-2, reception processing units 23-1 and 23-2, and a control unit 24. The antenna 21-1, the radio reception unit 22-1, and the reception processing unit 23-1 correspond to the "first link", and the antenna 21-2, the radio reception unit 22-2, and the reception processing unit 23-2 correspond to the "second link". The antennas 21-1 and 21-2 can be collectively referred to as "antennas 21". Further, the radio reception units 22-1 and 22-2 can be collectively referred to as "radio reception units 22". Further, the reception processing units 23-1 and 23-2 can be collectively referred to as "reception processing units 23". Note that the communication device 20 may also include the antennas 21, the radio reception units 22, and the reception processing units 23 applicable to links of communication systems different from the "first link" and the "second link". Further, when the "first link" and the "second link" are of the same communication system having different communication resources, the communication device 20 may include the antenna 21-1, the radio reception unit 22-1, and the reception processing unit 23-1 but may not include the antenna 21-2, the radio reception unit 22-2, and the reception processing unit 23-2.

The radio reception unit 22-1 receives a radio signal transmitted by the first link through the antenna 21-1 and performs radio reception processing (down conversion, analog-digital conversion etc.) to the received radio signal and outputs the obtained radio reception-processed signal to the reception processing unit 23-1. The radio reception unit 22-2 receives a radio signal transmitted by the second link through the antenna 21-2 and performs radio reception processing (down conversion, analog-digital conversion etc.) to the received radio signal and outputs the obtained radio reception-processed signal to the reception processing unit 23-2.

The reception processing unit 23-1 performs reception processing (modulation etc.) to the reception signal received from the radio reception unit 22-1 and then outputs the reception data that has been reception-processed to the control unit 24. The reception processing unit 23-2 performs reception processing (modulation etc.) to the reception signal received from the radio reception unit 22-2 and then outputs the reception data that has been reception-processed to the control unit 24.

The control unit 24 includes a quality value calculation unit 24A and a feedback control unit 24B. The quality value calculation unit 24A calculates a communication quality value (e.g., an error rate) of the first link based on the reception data received from the reception processing unit 23-1. Further, the quality value calculation unit 24A calculates a communication quality value (e.g., an error rate) of the second link based on the reception data received from the reception processing unit 23-2. That is, the communication quality value of the first link calculated by the quality value calculation unit 24A is the "reception quality based on the result of modulation processing". Further, the communication quality value of the second link calculated by the quality value calculation unit 24A is the "reception quality based on the result of modulation processing". That is, the communication quality value that is more effective compared to the reception quality related to reception power can be calculated by the quality value calculation unit 24A.

The feedback control unit 24B performs transmission control of transmitting the communication quality values of the first and second links calculated by the quality value calculation unit 24A as the feedback information to the communication device 10. Here, a feedback dedicated link (not shown) may be employed for transmission of the "feedback information". Further, a link (not shown) corresponding to the first link may be used for transmission of the communication quality value of the first link whereas a link (not shown) corresponding to the second link may be used for transmission of the communication quality value of the second link. Further, a link (not shown) corresponding to the second link may be used for transmission of the "feedback information".

<Example of Operation of a Communication System>

An example of operational processing performed by the communication system 1 having the aforementioned configuration is explained. Here, operational processing performed by a control device 11 of the communication device 10 on the transmission side is mainly explained.

<Example of Operational Processing Performed by a Distributing Control Unit>

Figure 4:
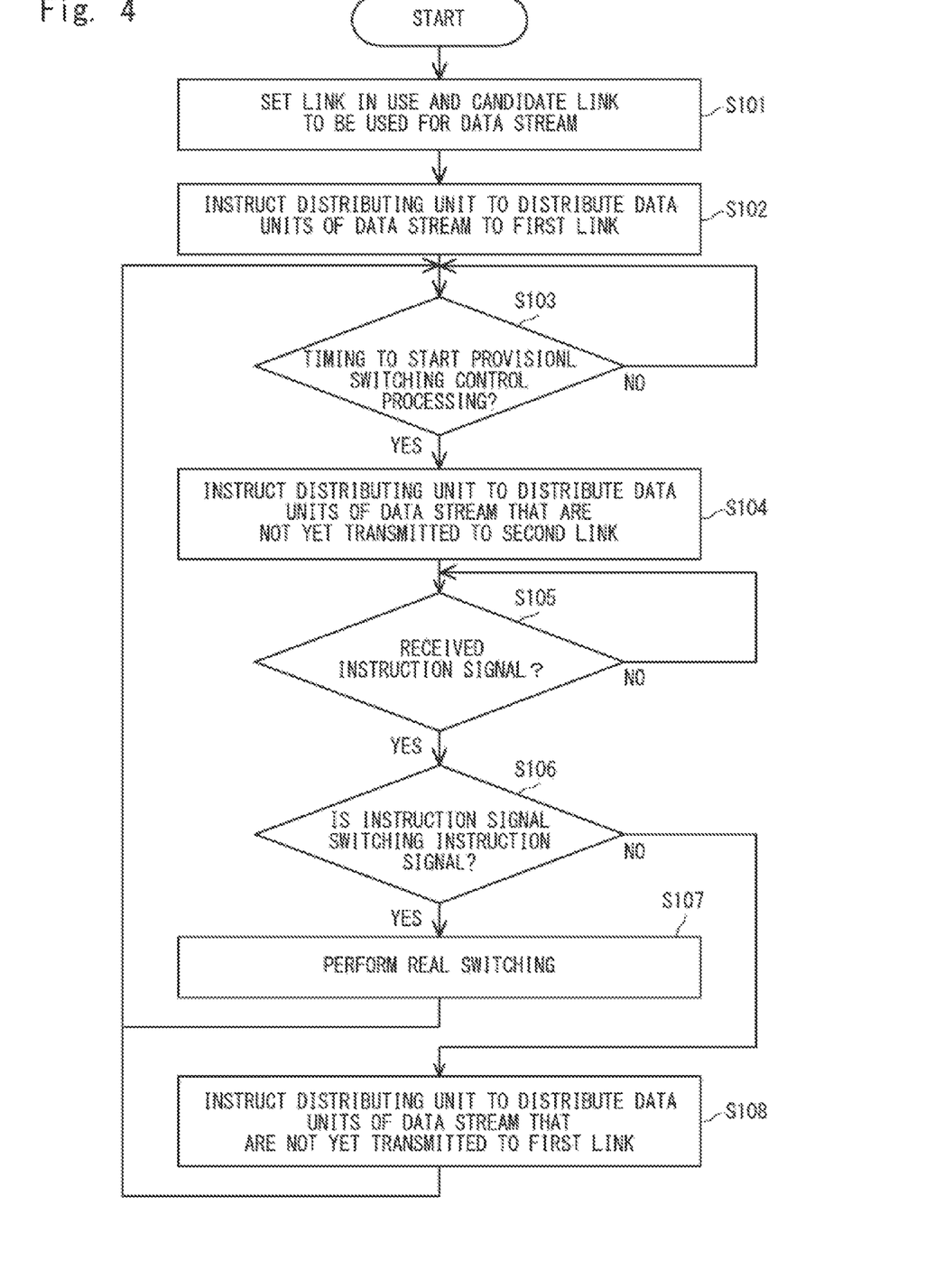
FIG. 4 is a flowchart showing an example of operational processing performed by a distributing control unit in the control device according the first example embodiment.

FIG. 4 is a flowchart showing an example of operational processing performed by the distributing control unit in the control device according to the first example embodiment.

In the control device 11, the distributing control unit 11B sets the link in use and the candidate link to be used for the data stream input to the control device 11 (Step S101). Here, the "link in use" is set to be the first link and the "candidate link to be used" is set to be the second link.

The distributing control unit 11B instructs the distributing unit 11A to distribute the data units of the data stream to the first link (Step S102). Accordingly, transmission of the data units using the first link starts.

The distributing control unit 11B waits for the timing to start the provisional switching control processing (Step S103 NO). When the timing at which the provisional switching control processing starts (Step S103 YES), the distributing control unit 11B instructs the distributing unit 11A to distribute the data units of the data stream that are not yet transmitted to the second link (Step S104).

The distributing control unit 11B waits for an instruction signal from the determining unit 11C (Step S105 NO).

When the distributing control unit 11B receives an instruction signal from the determining unit 11C (Step 105 YES), it determines whether or not an instruction signal is a switching instruction signal (Step S106).

When the instruction signal is a switching instruction signal (Step 106 YES), the distributing control unit 11B changes the link that is currently the candidate link to be used to the link in use and changes the link that is currently the link in use to the candidate link to be used (Step 107). In other words, real switching is performed. Accordingly, the data units of the data stream that are not yet to be transmitted are transmitted continuously by the second link. Then, the processing step returns to Step S103.

When the instruction signal is not the switching instruction signal, that is, when the instruction signal is the upholding instruction signal (Step S106 NO), the distributing control unit 11B instructs the distributing unit 11A to distribute the data units of the data stream that are not yet to be transmitted to the first link (Step S108). Then the processing step returns to Step S103.

Note that although omitted in FIG. 4, the flow of processing shown in FIG. 4 ends when, for example, transmission of all of the data units of the data stream is completed.

<Example of Operational Processing Performed by a Determining Unit>

Figure 5:
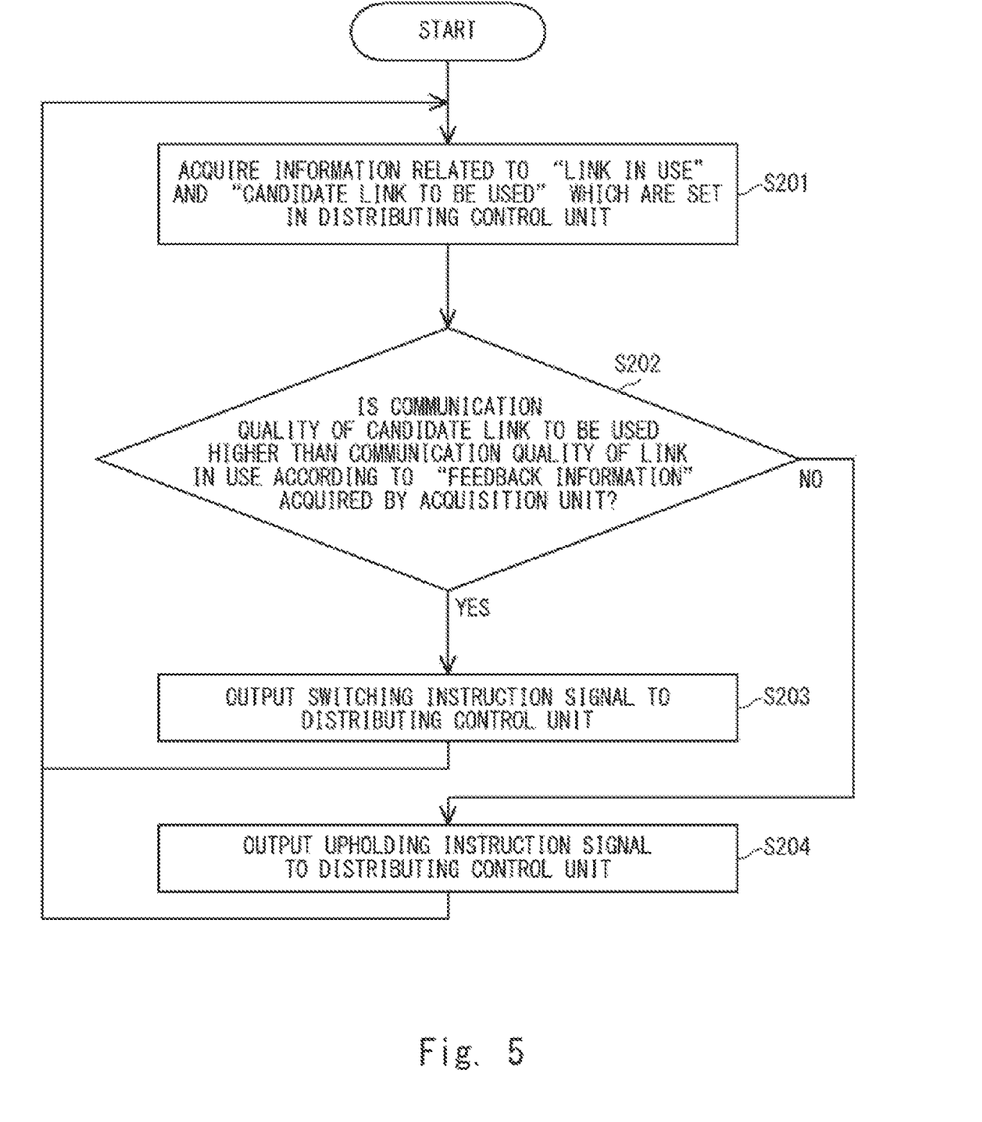
FIG. 5 is a flowchart showing an example of operational processing performed by a determining unit in the control device according to the first example embodiment.

FIG. 5 is a flowchart showing an example of the operational processing performed by the determining unit in the control device according to the first example embodiment.

The determining unit 11C acquires information related to the "link in use" and the "candidate link to be used" which are set in the distributing control unit 11B (Step S201). Here, the "link in use" is the first link and the "candidate link to be used" is the second link.

The determining unit 11C determines whether or not the communication quality of the candidate link to be used is higher than that of the link in use based on the "feedback information" acquired by the acquisition unit 11D (Step S202).

When the communication quality of the candidate link to be used is higher than that of the link in use (Step S202 YES), the determining unit 11C outputs the switching instruction signal to the distributing control unit 11B (Step S203). Then, the processing step returns to Step S201.

When the communication quality of the candidate link to be used is equal to or lower than that of the link in use (Step S202 NO), the determining unit 11C outputs the upholding instruction signal to the distributing control unit 11B (Step S204). Then, the processing step returns to Step S201.

Note that although omitted in FIG. 5, the flow of processing shown in FIG. 5 ends when, for example, transmission of all of the data units of the data stream is completed.

As described above, according to the first example embodiment, the distributing control unit 11B in the control device 11 performs the "provisional switching control processing" to the distributing unit 11A when the link in use for the first data units among the series of data units is the first link and the candidate link to be used is the second link. In the "provisional switching control processing", the distributing control unit 11B instructs the distributing unit 11A to distribute some of the data units of the first data units among the series of data units to the second link and distribute the other data units of the first data units to the first link. The determining unit 11C determines whether or not the link in use for the "second data units" is to be switched from the first link to the second link based on the "first communication quality" and the "second communication quality" according to the "feedback information". The "second data units" is subsequent to the first data units in the series of data units. The "first communication quality" is the communication quality of the other data units, and the "second communication quality" is the communication quality of some of the data units.

By this configuration of the control device 11, the communication quality of the link in use and that of the candidate link to be used can be calculated using the data units of the series of data units instead of a signal dedicated for measuring the communication quality in the communication device 20 on the reception side. Further, owing to the configuration of the control device 11, the link in use can be switched to a more suitable link at an early timing based on the feedback information from the communication device 20. That is, it is possible to switch the link while preventing lowering of the resource usage efficiency.

Further, in the control device 11, the determining unit 11C determines that the link in use is to be switched from the first link to the second link when the second communication quality is higher than the first communication quality.

By this configuration of the control device 11, the link in use can be switched to a more suitable link.

Note that as described above, the determining unit 11C may determine that the link in use is to be switched from the first link to the second link when the second communication quality is higher than the predetermined level as well as when the second communication quality is higher than the first communication quality.

Second Example Embodiment

A second example embodiment relates to a specific example of a trigger for performing the "provisional switching processing" according to the first example embodiment. Note that the basic configurations of a communication system, a communication device on the transmission side, and the communication device on the reception side according to the second example embodiment are the same as those of the communication system 1, the communication device 10, and the communication device 20 according to the first example embodiment and thus, they are explained with reference to FIGS. 1 to 3.

The acquisition unit 11D of the control device 11 according to the second example embodiment acquires the communication quality value of the link in use (here, the first link) in a predetermined period (a "first period"). That is, the communication device 20 according to the second example embodiment feeds back the communication quality value of the link in use (here, the first link) in the first period.

The distributing control unit 11B in the control device 11 according to the second example embodiment performs the provisional switching control processing when the communication quality value of the link in use (i.e., the first communication quality) becomes lower than the "predetermined level". That is, the trigger for performing the "provisional switching control processing" is to meet a condition in which the first communication quality becomes lower than the "predetermined level". In other words, the timing at which the provisional switching control processing is performed is when the first communication quality becomes lower than the "predetermined level". Alternatively, the distributing control unit 11B does not perform the provisional switching control processing when the first communication quality is equal to or higher than the "predetermined level".

As described above, according to the second example embodiment, in the control device 11, the distributing control unit 11B performs the provisional switching control processing when the communication quality based on the communication quality value of the link in use (i.e., the first communication quality) is lower than the "predetermined level".

Owing to this configuration of the control device 11, it is possible to avoid the provisional switching control processing from being performed when the communication quality of the link in use is not lowered, whereby it is possible to reduce the processing load of the control device 11.

Modified Example

Although in the aforementioned explanation, the trigger for performing the "provisional switching control processing" had to meet the condition that the first communication quality is lower than the "predetermined level", it is not limited thereto. For example, the "provisional switching control processing" may be performed in a predetermined period (a "second period"). For example, the second period may be N-times the first period (N is a natural number equal to or larger than 2). Alternatively, the trigger for performing the "provisional switching control processing" may also be when a condition in which the communication quality based on the communication quality value of the link in use for every first period (i.e., the first communication quality) is lower than the "predetermined level" by M times in a row (M is a natural number equal or larger than 2) is met.

Third Example Embodiment

In a third example embodiment, a score calculated based on the feedback information is used in determining whether or not the link in use is to be switched. A communication system according to the third example embodiment includes a communication device 30 on the transmission side and a communication device 40 on the reception side. The "first link" and the "second link" are established between the communication devices 30 and 40 in the similar manner as in the first and second example embodiments. That is, the communication device 30 transmits the data stream (i.e., the series of data units) to the communication device 40 using the first and second links.

<Example of a Configuration of a Communication Device on the Transmission Side>

Figure 6:
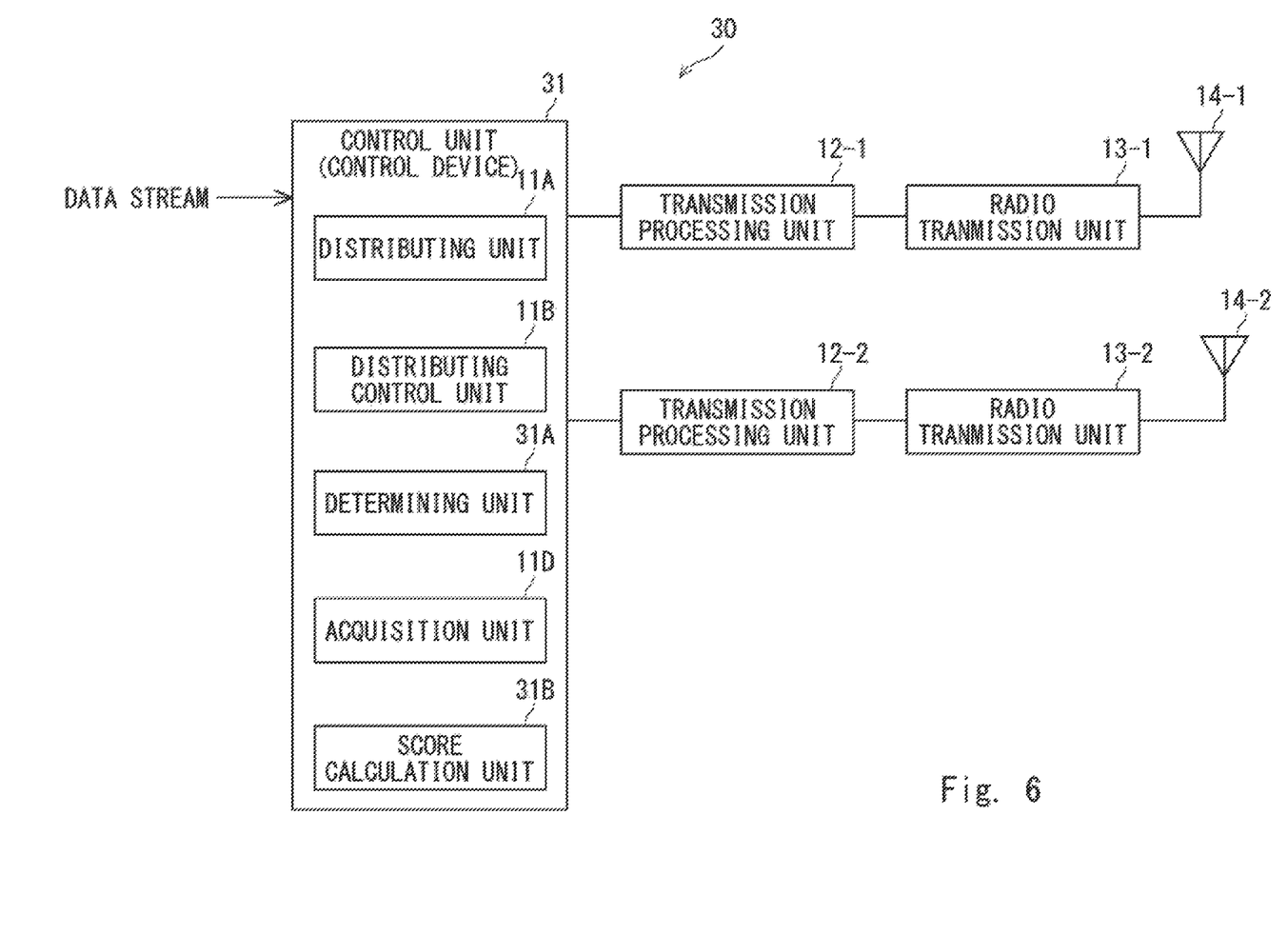
FIG. 6 is block diagram showing an example of a communication device on a transmission side including a control device according a third example embodiment.

FIG. 6 is a block diagram showing an example of the communication device on the transmission side including the control device according to the third example embodiment. In FIG. 6, the communication device 30 includes a control unit (a control device) 31, the transmission processing units 12-1 and 12-2, the radio transmission units 13-1 and 13-2, and the antennas 14-1 and 14-2.

The control unit (the control device) 31 includes the distributing unit 11A, the distributing control unit 11B, the acquisition unit 11D, a determining unit 31A, and a score calculation unit 31B.

The acquisition unit 11D acquires the "feedback information" from the communication device 40. The feedback information according to the third example embodiment includes the number of data units received within each "unit period" (first unit number), the reception quality based on the result of modulation processing (first reception quality), and the reception quality related to the reception power (second reception quality) of the link in use (herein, the first link). The first reception quality is, for example, an error rate. The second reception quality is, for example, RSSI (Received Signal Strength Indicator). Further, the feedback information according to the third example embodiment includes the number of data units (second unit number) received within each "unit period", the reception quality based on the result of modulation processing (third reception quality), and the reception quality related to the reception power (fourth reception quality) of the candidate link to be used (herein, the second link). Here, the unit period" may be the same as each of the "first period", and may be, for example, a period of 100 ms.

The score calculation unit 31B calculates the quality score (a first quality score) of the link in use based on the first and second reception qualities. Further, the score calculation unit 31B calculates the quality score (a second quality score) of a candidate link to be used based on the third and fourth communication qualities. Note that a method of calculating the quality score is described later in detail.

The determining unit 31A determines whether or not the link in use for the "second data units" is to be switched from the first link to the second link based on the first and second quality scores obtained by performing the "provisional switching control processing" by the distributing control unit 11B. For example, the determining unit 31A may determine that the link in use is to be switched from the first link to the second link when the second quality score is higher than the first quality score. Alternatively, the determining unit 31A may determine that the first link is to be maintained as the link in use when the second quality score is the same as or lower than the first quality score. Alternatively, the determining unit 31A determines a communication quality state of the link in use and that of the candidate link to be used, and according to the result of the determination, it may determine whether or not the link in use for the "second data units" is to be switched from the first link to the second link. Determination of the communication quality state and determination of switching the link in use will be described later in detail.

<Example of a Configuration of a Communication Device on the Reception Side>

Figure 7:
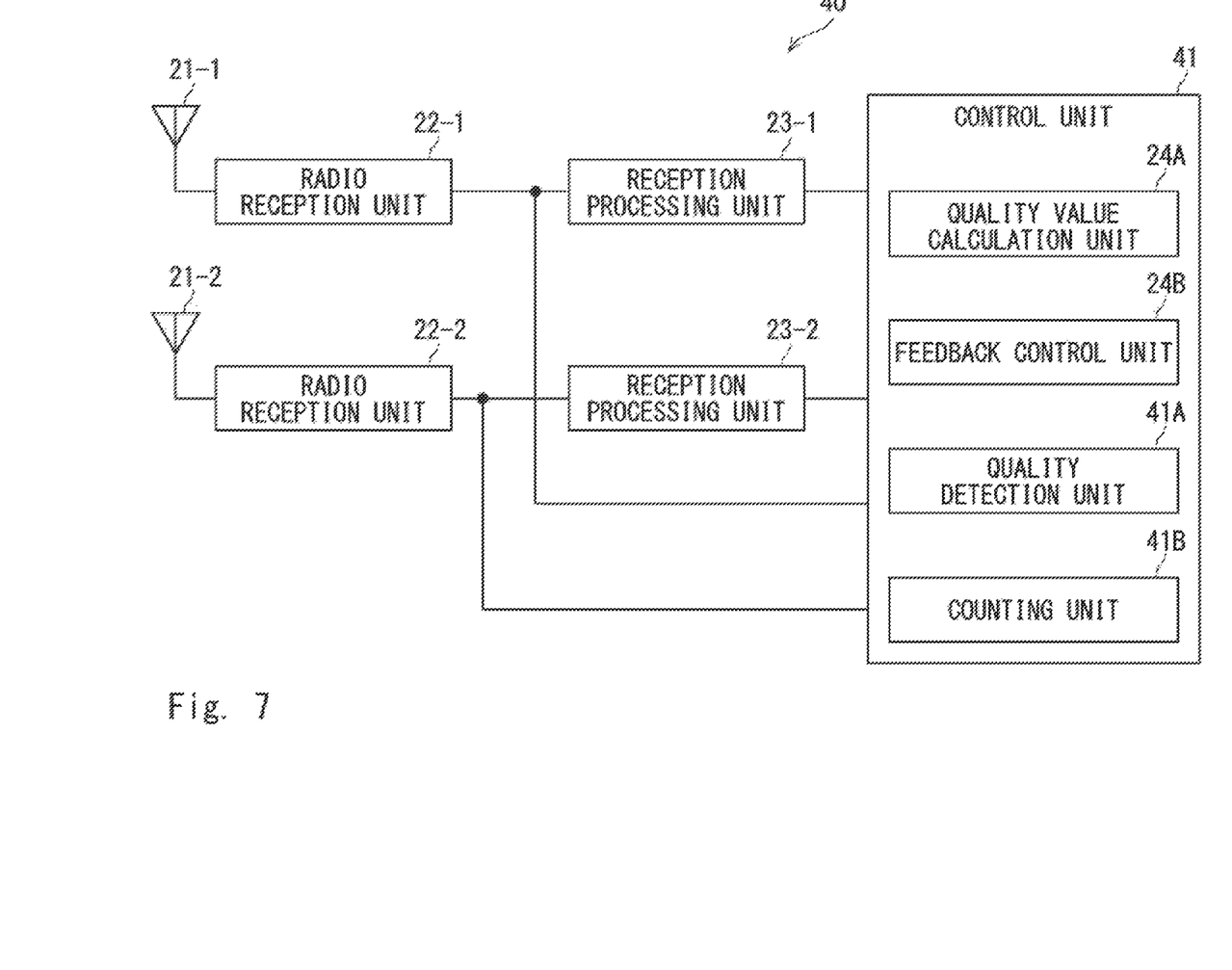
FIG. 7 is block diagram showing an example of a communication device on a reception side according to the third example embodiment.

FIG. 7 is a block diagram showing an example of the communication device on the reception side according to the third example embodiment. In FIG. 7, the communication device 40 includes the antennas 21-1 and 21-2, the radio reception units 22-1 and 22-2, the reception processing units 23-1 and 23-2, and a control unit 41.

The control unit 41 includes the quality value calculation unit 24A, the feedback control unit 24B, a quality detection unit 41A, and a counting unit 41B.

The quality value calculation unit 24A calculates the first reception quality based on an output signal of the reception processing unit 23-1. Further, the quality value calculation unit 24A calculates the third reception quality based on an output signal of the reception processing unit 23-2.

The quality detection unit 41A detects the second reception quality based on the output signal of the radio reception unit 22-1. Further, the quality detection unit 41A detects the fourth quality based on the output signal of the radio reception unit 22-2.

The counting unit 41B calculates the first unit number based on the output signal of the reception processing unit 23-1. Further, the counting unit 41B calculates the second unit number based on the output signal of the reception processing unit 23-2.

The feedback control unit 24B transmits the first unit number, the first reception quality, and the second reception quality as the feedback information to the communication device 30. Further, the feedback control unit 24B transmits the second unit number, the third reception quality, and the fourth reception quality as the feedback information to the communication device 30.

<Example of Operational Processing of a Communication System>

An example of operational processing performed by the communication system having the aforementioned configuration according to the third example embodiment is explained. Here, the operational processing performed by the control device 31 of the communication device 30 on the transmission side will be mainly explained.

<Method of Calculating a Quality Score>

Figure 8:
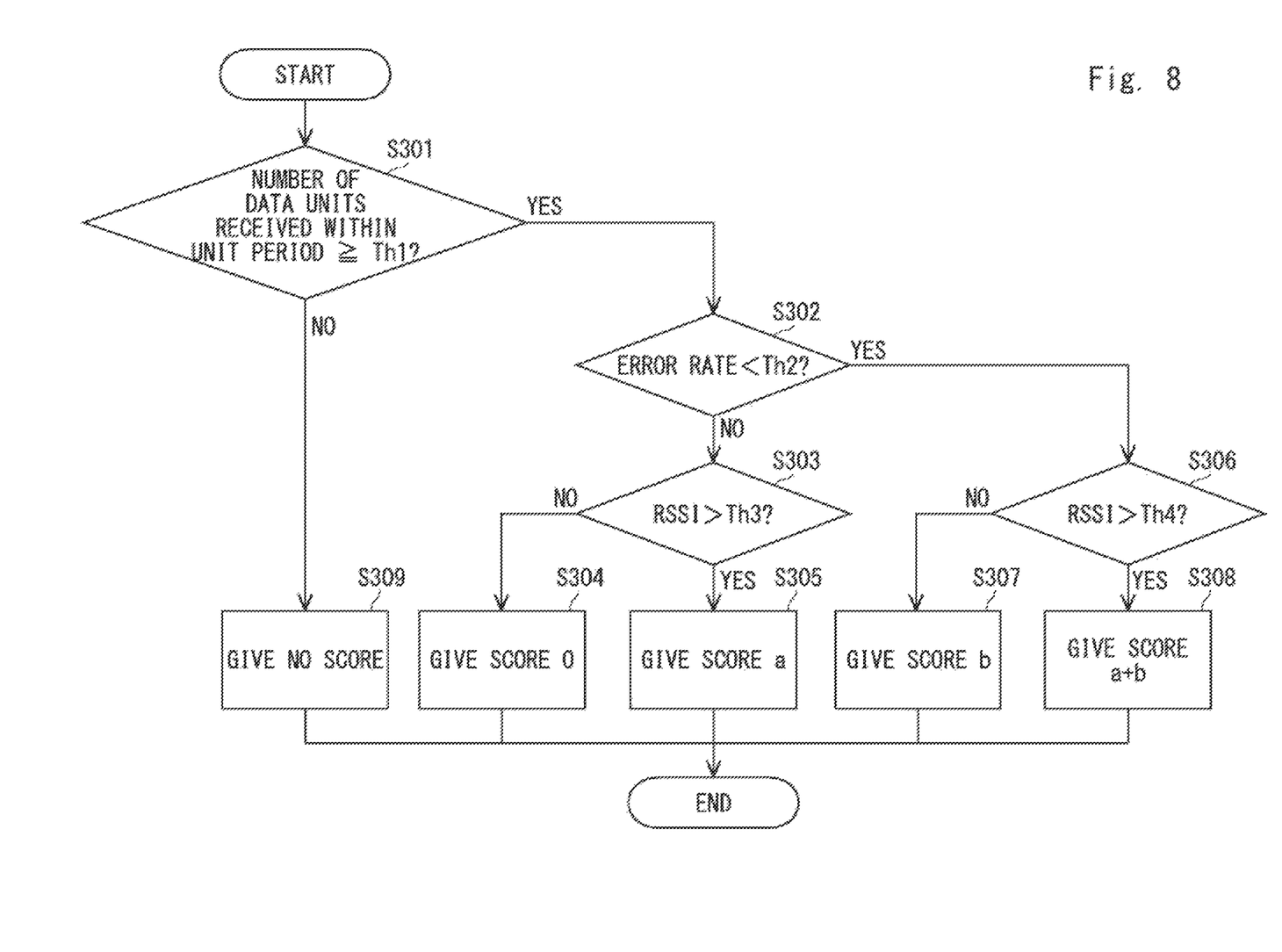
FIG. 8 is a flowchart showing an example of a method of calculating a quality score according to the third example embodiment.

FIG. 8 is a flowchart showing an example of a method of calculating a quality score according to the third example embodiment. The flow of processing shown in FIG. 8 is carried out when the feedback information including the first unit number and the first and second reception qualities is acquired. Further, the flow of processing shown in FIG. 8 is also carried out when the feedback information including the second unit number and the third and fourth reception qualities is acquired. Here, an explanation is given in the case where the feedback information including the first unit number, the first reception quality, and the second reception quality is acquired.

The score calculation unit 31B determines whether or not the first unit number, that is, the number of data units received within the unit period in the link in use, is equal to or higher than a threshold value Th1 (Step S301). This determination is performed in order to determine the accuracy of the first reception quality since there is a possibility that the first reception quality may not be very accurate when the first unit number is small. Therefore, when the first unit number is smaller than the threshold value Th1 (Step S301 NO), the score calculation unit 31B does not give any score to the communication quality state of the link in use (Step S309).

When the first unit number is equal to or larger than the threshold value Th1 (Step S301 YES), the score calculation unit 31B determines whether or not the first reception quality (e.g., an error rate) is smaller than a threshold value Th2 (Step S302).

When the first reception quality (e.g., an error rate) is equal to or larger than the threshold value Th2 (Step S302 NO), the score calculation unit 31B determines whether or not the second reception quality (e.g., RSSI) is larger than a threshold value Th3 (Step S303).

When the second reception quality (e.g., RSSI) is equal to or smaller than the threshold value Th3 (Step S303 NO), the score calculation unit 31B gives a score "zero" to the communication quality state of the link in use (Step S304). When the second reception quality (e.g., RSSI) is larger than the threshold value Th3 (Step S303 YES), the score calculation unit 31B gives a score "a" to the communication quality state of the link in use (Step S305). Here, the value "a" is, for example, a value larger than 0 and smaller than 100.

When the first reception quality (e.g. an error rate) is smaller than the threshold value Th2 (Step S302 YES), the score calculation unit 31B determines whether or not the second reception quality (for example, RSSI) is larger than the threshold value Th4 (Step S306).

When the second reception quality (e.g., RSSI) is equal to or smaller than the threshold value Th4 (Step S306 NO), the score calculation unit 31B gives a score "b" to the communication quality state of the link in use. Here, the value "b" is, for example, a value larger than 0 and smaller than 100 provided that the value "b" is larger than the value "a".

When the second reception quality (e.g., RSSI) is larger than the threshold value Th4 (Step S306 YES), the score calculation unit 31B gives a score "a+b" to the communication quality state of the link in use (Step S308). Here, the threshold values Th1, Th2, Th3, and Th4 and the values "a" and "b" may be adjusted as appropriate. Further, it is possible to avoid the communication quality state of the link in use not being given a score by setting the threshold value Th1 to zero.

As described above, by using the second unit number, the third reception quality, and the fourth reception quality, a score can also be given to the communication quality state of the candidate link to be used.

<Method of Determining a Communication Quality State and Method of Determining Switching of a Link in Use>

The determining unit 31A may determine the communication quality state of the link in use and that of the candidate link to be used based on the score given to the communication quality state of the link in use and that given to the candidate link to be used, respectively, as well as the threshold value Th5. For example, the determining unit 31A determines that the communication quality state of the link in use is in a "satisfactory state" when the score given to the communication quality state of the link in use is larger than the threshold value Th5, whereas it determines that the communication quality state of the link in use is in a "unsatisfactory state" when the score given to the communication quality state of the link in use is equal to or smaller than the threshold value Th5. Further, the determining unit 31A determines that the communication quality state of the candidate link to be used is in a "satisfactory state" when the score given to the communication quality state of the candidate link to be used is larger than the threshold value Th5. On the other hand, the determining unit 31A determines that the communication quality state of the candidate link to be used is in an "unsatisfactory state" when the score given to the communication quality state of the candidate link to be used is equal to or smaller than the threshold value Th5. For example, by setting the threshold value Th5 to fall between the values "b" and "a+b", the communication quality state of the link in use or the candidate link to be used is determined to be in a "satisfactory state" when the score is "a+b" and the communication quality state of the link in use or the candidate link to be used is determined to be in an "unsatisfactory state" when the score is "zero", "a", or "b".

Figure 9:
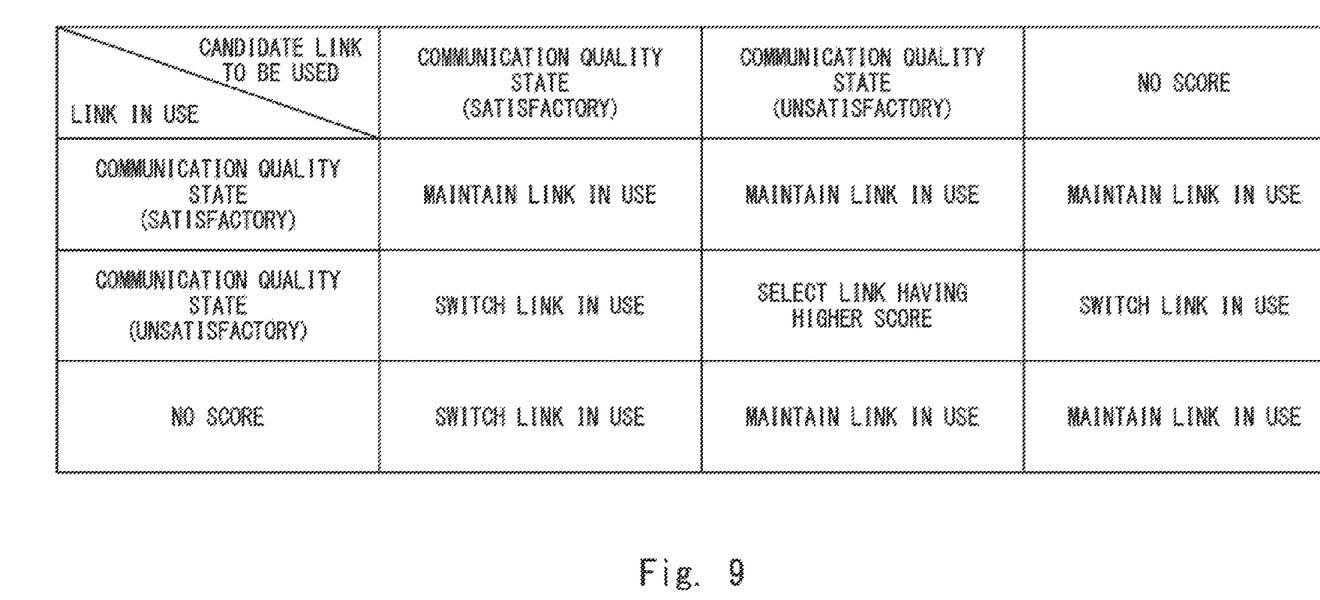
FIG. 9 shows an example of a switching rule table according to the third example embodiment.

Then, the determining unit 31A determines whether or not the link in use is to be switched based on the communication quality state of the link in use and that of the candidate link to be used, which have been determined, and a "switching rule table". FIG. 9 shows an example of a switching rule table according to the third example embodiment. The switching rule table is held in, for example, a memory (not shown) of the control device 31.

The determining unit 31A determines that the link in use is maintained even when the communication quality state of the candidate link to be switched is any one of the "satisfactory state", the "unsatisfactory state", or "no score" in the case where the communication quality state of the link in use is in the satisfactory state. That is, when the link currently in use is the first link, the "second data units" is transmitted to the first link. Further, the determining unit 31A determines that the link in use is to be switched when the communication quality state of the link in use is unsatisfactory and the communication quality state of the candidate link to be used is either the "satisfactory state" or "no score". That is, when the link currently in use is the first link and the candidate link to be used is the second link, the second link serves as a new link in use and the first link serves as a new candidate link to be used. Accordingly, the "second data units" is transmitted by the second link. When both the communication quality state of the link in use and that of the candidate link to be used are in the unsatisfactory state, the determining unit 31A determines that the link having a higher score be the link in use and the link having a lower score be the candidate link to be used. Further, the determining unit 31A determines that the link in use is to be switched when the communication quality state of the link in use has "no score" and that of the candidate link to be used is satisfactory. Further, the determining unit 31A determines that the link in use is to be maintained when the communication quality state of the link in use has "no score" and that of the candidate link to be used is in an unsatisfactory state or has "no score".

Other Example Embodiments

<1> The first to third example embodiments have been explained on the assumption that the number of the candidate links to be used is one. However, it is not limited thereto and the number of the candidate links to be used may be two or more. In this case, the distributing control unit 11B may determine the priority of the plurality of links that are the candidate links to be used based on, for example, the RSSI or the SN ratio or the band occupancy rate of each of these links. For example, the higher the RSSI or the SN ratio of a link, the higher the priority of that link becomes. Further, for example, the lower the band occupancy rate of a link, the higher the priority of that link becomes. Furthermore, the distributing control unit 11B may perform the "provisional switching control processing" by using the link of the highest priority.

<2> In the first to third example embodiments, the explanation has been given on the assumption that one data stream is input to each of the control devices 11 and 31. However, it is not limited thereto and a plurality of data streams may be input to each control device. In this case, each of the control devices 11 and 31 performs the processing described in the first to third example embodiments for each data stream, that is, on a data stream basis. Further, they may be configured so that the real switching of the link in use is more likely to be performed for the data stream having higher QoS. For example, in the third example embodiment, the score calculation unit 31B and the determining unit 31A may adjust the threshold values Th1, Th2, Th3, and Th4 and the values "a" and "b" so that the real switching of the link in use be more likely to be performed for the data stream having higher QoS. Further, one or both of the "first period" and the "second period" described in the second example embodiment may be set short for the data stream having higher QoS. By this configuration, it is possible to increase the opportunity of determining whether or not the "provisional switching control processing" be performed, or the opportunity of performing the "provisional switching control processing".

Figure 10:
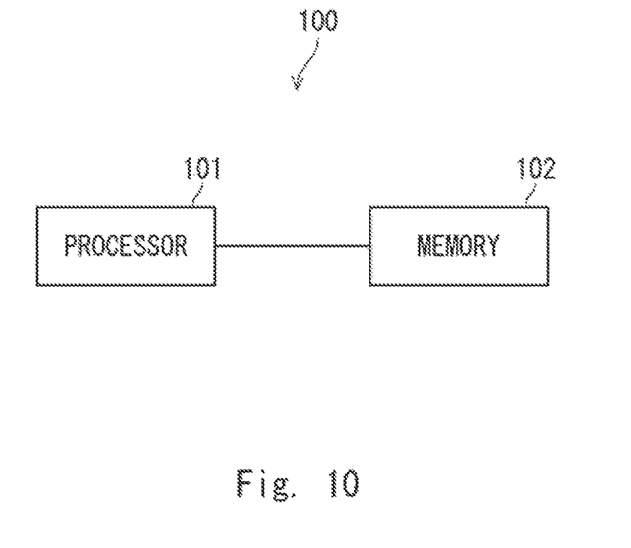
FIG. 10 is a diagram showing an example of a hardware configuration of a control device.

<3> FIG. 10 is a diagram showing an example of a hardware configuration of a control device. In FIG. 10, a control device 100 includes a processor 101 and a memory 102. In the first to third example embodiments, the distributing unit 11A, the distributing control unit 11B, the determining units 11C and 31A, the acquisition unit 11D, and the score calculation unit 31B of the control units (the control devices) 11 and 31 may be implemented by loading and executing a program stored in the memory 102 by the processor 101. The program is stored using any type of non-transitory computer readable medium and can be supplied to the control units (the control devices) 11 and 31. Further the program can be supplied to the control units (the control devices) 11 and 31 using any type of transitory computer readable medium.

The first, second and third embodiments can be combined as desirable by one of ordinary skill in the art.

According to the present disclosure, it is possible to provide a control device, a communication device, a control method, and a control program by which links can be switched while preventing lowering of the resource usage efficiency.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A control device comprising:
   hardware, including a processor and a memory;
   a distributing unit that is implemented at least by the hardware and configured to distribute data units included in a series of data units to a first link and a second link;

an acquisition unit that is implemented at least by the hardware and configured to acquire information related to communication quality of the series of data units as feedback information from a reception-side device configured to receive the series of data units;

a distributing control unit that is implemented at least by the hardware and configured to perform provisional switching control processing for instructing the distributing unit to distribute at least one data unit of first data units among the series of data units to the second link and distribute the other data units of the first data units to the first link when a link in use for the first data units is the first link and a candidate link to be used is the second link; and a determining unit that is implemented at least by the hardware and configured to determine whether or not a link in use for second data units subsequent to the first data units is to be switched from the first link to the second link based on first communication quality of the other data units and second communication quality of the at least one data unit, the first communication quality and the second communication quality being determined according to the feedback information, wherein:

the acquisition unit acquires the feedback information including first reception quality based on a result of modulation processing performed by the reception-side device and second reception quality related to reception power for a reception signal corresponding to the other data units, and the control device further comprises a calculation unit that is implemented at least by the hardware and configured to calculate a first quality score corresponding to the first communication quality based on the first reception quality and the second reception quality.

2. The control device according to claim 1, wherein the distributing control unit performs the provisional switching control processing when the first communication quality is lower than a predetermined level and does not perform the provisional switching control processing when the first communication quality is equal to or higher than the predetermined level.

3. The control device according to claim 1, wherein the determining unit determines that the link in use for the second data units is to be switched from the first link to the second link when the second communication quality is higher than the first communication quality.

4. The control device according to claim 1, wherein:

the acquisition unit acquires the feedback information including third reception quality based on a result of modulation processing performed by the reception-side device and fourth reception quality related to the reception power for a reception signal corresponding to the at least one data unit; and the calculation unit calculates a second quality score corresponding to the second communication quality based on the third reception quality and the fourth reception quality.

5. A communication device comprising the control device according to claim 1.

6. A control method comprising:

distributing data units included in a series of data units to a first link and a second link;

acquiring information related to communication quality of the series of data units as feedback information from a reception-side device configured to receive the series of data units;

instructing, in the distributing of the data units, to distribute at least one data unit of first data units among the series of data units to the second link and distribute the other data units of the first data units to the first link when a link in use for the first data units is the first link and a candidate link to be used is the second link; and determining whether or not a link in use for second data units subsequent to the first data units is to be switched from the first link to the second link based on first communication quality of the other data units and second communication quality of the at least one data unit, the first communication quality and second communication quality being determined according to the feedback information, wherein:

the feedback information includes first reception quality based on a result of modulation processing performed by the reception-side device and second reception quality related to reception power for a reception signal corresponding to the other data units, and the control method further comprises calculating a first quality score corresponding to the first communication quality based on the first reception quality and the second reception quality.

7. A non-transitory computer-readable medium storing a program that causes a computer to execute processes of:

distributing data units included in a series of data units to a first link and a second link;

acquiring information related to communication quality of the series of data units as feedback information from a reception-side device configured to receive the series of data units;

instructing, in the distributing of the data units, to distribute at least one data unit of first data units among the series of data units to the second link and distribute the other data units of the first data units to the first link when a link in use for the first data units is the first link and a candidate link to be used is the second link; and determining whether or not a link in use for second data units subsequent to the first data units is to be switched from the first link to the second link based on first communication quality of the other data units and second communication quality of the at least one data unit, the first communication quality and the second communication quality being determined according to the feedback information, wherein:

the feedback information includes first reception quality based on a result of modulation processing performed by the reception-side device and second reception quality related to reception power for a reception signal corresponding to the other data units, and the processes further comprises calculating a first quality score corresponding to the first communication quality based on the first reception quality and the second reception quality.

* * * * *